US011982123B2

(12) United States Patent
Taylor et al.

(10) Patent No.: US 11,982,123 B2
(45) Date of Patent: May 14, 2024

(54) ADJUSTABLE DOOR

(71) Applicant: Meshtec International Co., Ltd, Chiang Mai (TH)

(72) Inventors: Peter Syme Taylor, New Farm (AU); David Neil Edlin, Chiang Mai (TH)

(73) Assignee: Meshtec International Co., Ltd, Chiang Mai (TH)

( * ) Notice: Subject to any disclaimer, the term of this patent is extended or adjusted under 35 U.S.C. 154(b) by 102 days.

(21) Appl. No.: 17/730,433

(22) Filed: Apr. 27, 2022

(65) Prior Publication Data

US 2022/0356752 A1 Nov. 10, 2022

(30) Foreign Application Priority Data

May 5, 2021 (AU) ................................ 2021202848

(51) Int. Cl.

*E06B 7/18* (2006.01)
*E05D 7/00* (2006.01)
*E06B 7/28* (2006.01)
*E06B 3/70* (2006.01)

(52) U.S. Cl.

CPC .............. *E06B 7/28* (2013.01); *E05D 7/0009* (2013.01); *E06B 2003/7046* (2013.01)

(58) Field of Classification Search

CPC ..... E06B 2003/7046; E06B 2003/7096; E06B 7/18; E06B 5/11; E05D 7/0009
See application file for complete search history.

(56) References Cited

U.S. PATENT DOCUMENTS 1,073,160 A * 9/1913 Newpher ................ E04C 3/005 52/645
4,148,953 A * 4/1979 Horton .................. E06B 7/2301 428/92
4,531,337 A * 7/1985 Holdiman ............. E06B 1/6015 49/505
4,712,331 A * 12/1987 Fujiwara ............... E06B 7/2316 49/495.1
5,916,660 A * 6/1999 Currie ........................ B60S 1/38 428/122
8,146,295 B2 * 4/2012 Kibbel ....................... E06B 1/14 49/504
9,228,390 B2 * 1/2016 Lee ........................... E06B 7/28
10,066,435 B2 * 9/2018 Tomlinson ................ E06B 7/28

FOREIGN PATENT DOCUMENTS

AU 2016200512 B2 * 4/2019
CA 2269433 A1 * 10/2000 ............. E06B 7/086
GB 1123660 A * 8/1968
WO WO-2014008534 A1 * 1/2014 ............. E06B 3/726

* cited by examiner

*Primary Examiner* — Adriana Figueroa
(74) *Attorney, Agent, or Firm* — Fitch, Even, Tabin & Flannery, LLP

(57) ABSTRACT

A door which is adjustable in length and breadth is defined by an outer sash having a generally rectangular configuration. A hinge side of the sash nests within a U-sweep member running along its length. The U-sweep member interfaces with the sash through a step adjust adaptor secured to a hinge side member of the sash and extending along at least one of its inner and outer faces. The step adjust adaptor interfaces with the U-sweep member through a series of spaced apart detents which may be ridges and grooves to provide incremental adjustment of the breadth of the door. An L-sweeper is securable to a bottom member of the sash and is adjustable to vary a length (height) of the door.

10 Claims, 11 Drawing Sheets

ADJUSTABLE DOOR

FIELD OF INVENTION

The invention relates to security doors, particularly those intended for the "do-it-yourself" (DIY) market

BACKGROUND OF THE INVENTION

Traditionally, security doors are installed by professionals as the process requires a careful "check measure" process to ensure that the doors are made to a correct size. Although doors are mostly standard sizes, often there can be variations between them, even of only a few millimeters and even within the same building. The present door addresses this issue for the DIY-er in installing the door in their own home by giving a degree of adjustment.

SUMMARY OF THE INVENTION

An adjustable door has an outer sash with a hinge side member opposite a closure side member with opposite top and bottom members extending between and attached to the hinge side and closure side members to define a generally rectangular sash extending about a door panel.

Each of the hinge side and bottom side members has an inner face opposite an outer face. The hinge side member has an edge face extending between its inner and outer faces. The bottom member has a downwardly facing lower face extending between its inner and outer faces. A U-sweep member has a generally rectangular U-shaped cross-section having a base and opposite side legs defining a channel for receiving part of the hinge side member between the opposite legs with a respective of the opposite legs facing the front and rear faces of the hinge side member. A step adjust adaptor is secured to the hinge side member and extends along at least one of the outer and inner faces of the hinge side member between the hinge side member and the opposite legs of the U-sweep. The step adjust adaptor and the U-sweep member have respective parts of a step lock mechanism running along a length thereof. The step lock mechanism provides a plurality of spaced apart detent positions for arresting the U-sweep member with its base at pre-determined spacings from the edge face of the hinge side member to vary a breadth of the door.

The adjustable door may further comprise an L-sweeper securable to the bottom member. The L-sweeper has an attachment arm generally perpendicular to a sweeper arm. The attachment arm is securable to the outer face of the bottom member with a sweeper arm extending below the lower face of the bottom member. The sweeper arm has a channel for receiving a sweeper member.

The step adjust adaptor may have a generally L-shaped cross-section with a base of the L extending across the edge face of the hinge side member and being secured thereto.

The door may have two of the step adjust adaptors joined by a base to define a generally U-shaped cross-section. The base is secured to the edge face of the inside member. One of the two step adjust adaptors runs along the inner face of the hinge side member and the other of the two step adjust adaptors runs along the outer face of the hinge side member.

The step lock mechanism may have a plurality of generally parallel receiver channels running along one of the step lock adjuster and an interior face of at least one of the legs of the U-sweep. At least one ridge runs along the other of the step lock adjuster and an interior face of the U-sweep for engaging the channels.

The sweeper member may be a rubber serrate or bristles.

The sash, U-sweep and step adjust adaptor may be aluminium extrusions.

An outer face of at least one of the legs of the U-sweep member may have a plurality of generally parallel V-grooves running therealong to provide an alignment indicator for the mounting of fixing screws. The fixing screws extend through the leg, step adjust adaptor and rear face of the hinge side member.

The sweep arm of the L-sweeper may have vertically extending slots to admit fasteners for adjustably securing the L-sweep to the bottom member while allowing for length adjustment of the adjustable door.

BRIEF DESCRIPTION OF THE DRAWINGS

Preferred embodiments of the present invention are described below with reference to the accompanying illustrations in which.

DETAILED DESCRIPTION

Figure 1:
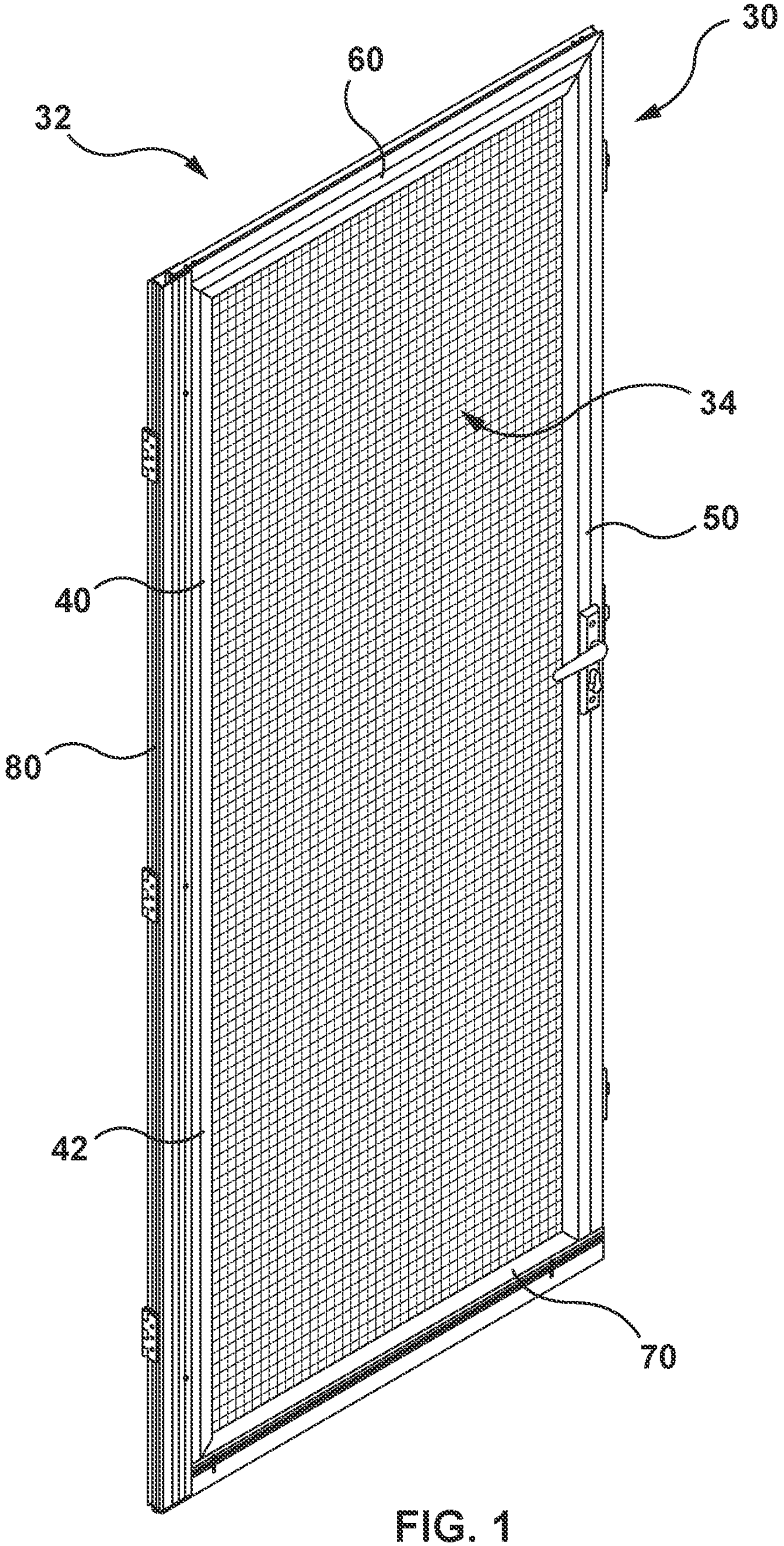
FIG. 1 is a perspective view of an adjustable door according to the present invention.
Figure 1A:
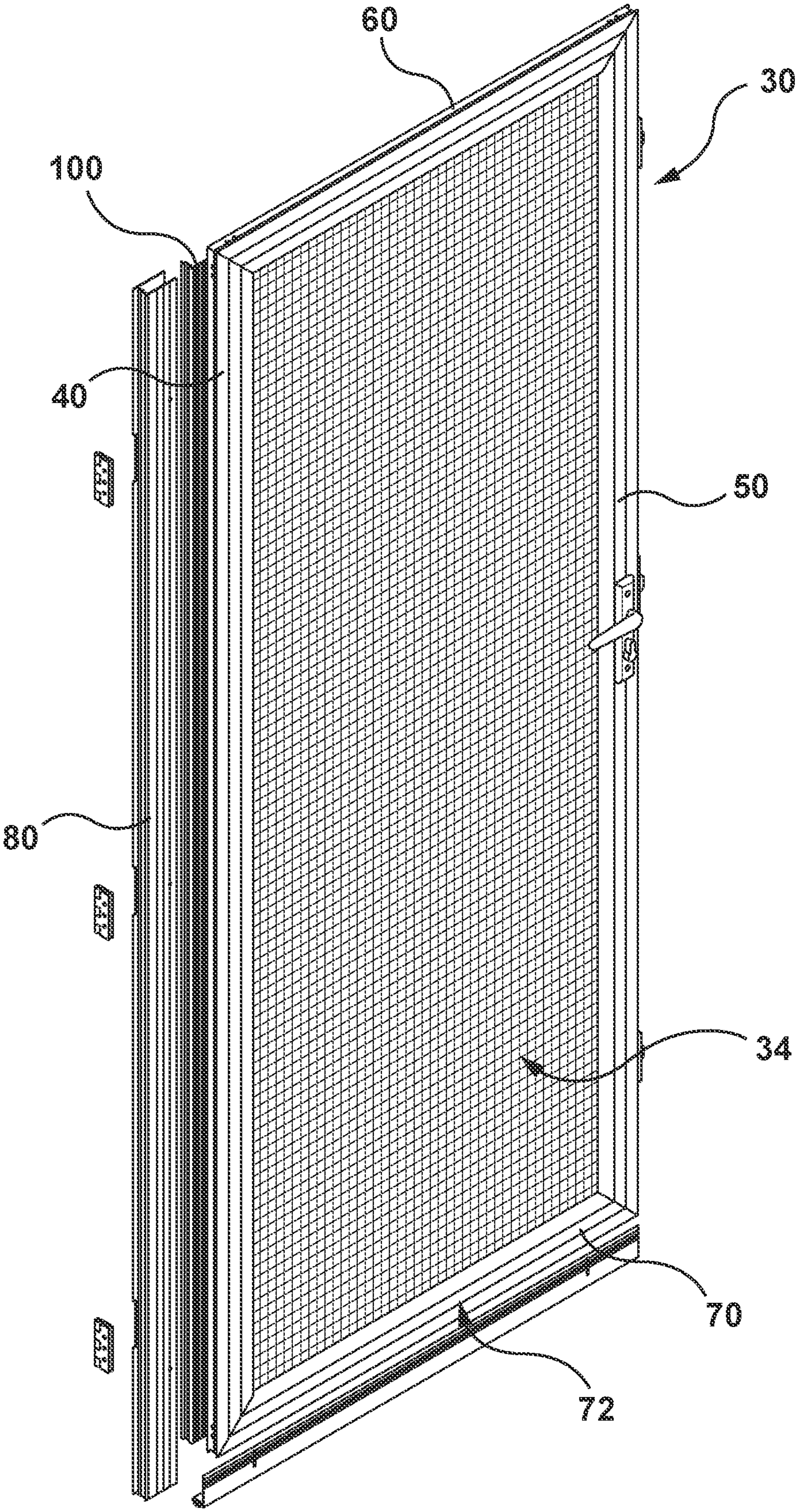
FIG. 1A is an exploded view of the adjustable door in FIG. 1.
Figure 4:
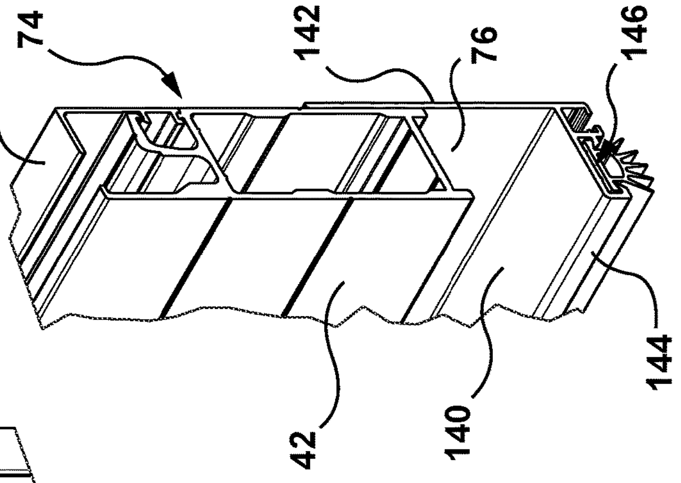
FIG. 4 is an enlargement of the area 4 is FIG. 2.
Figure 3:
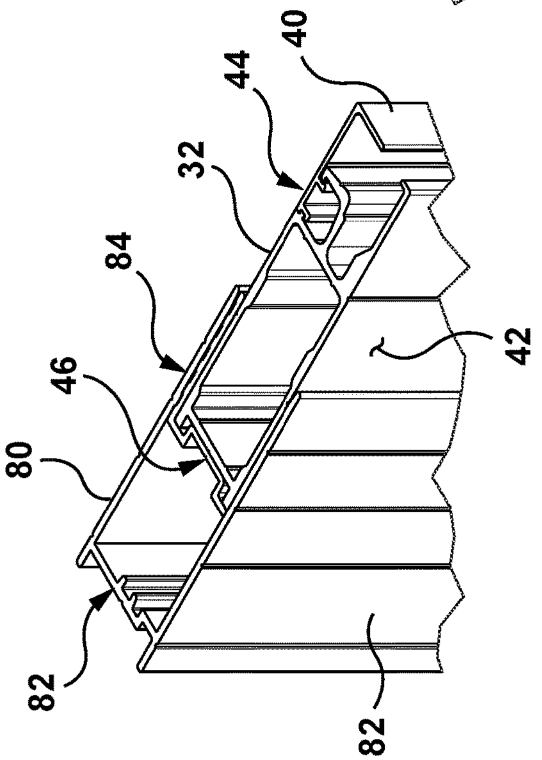
FIG. 3 is an enlargement of the area 3 in FIG. 2.
Figure 2:
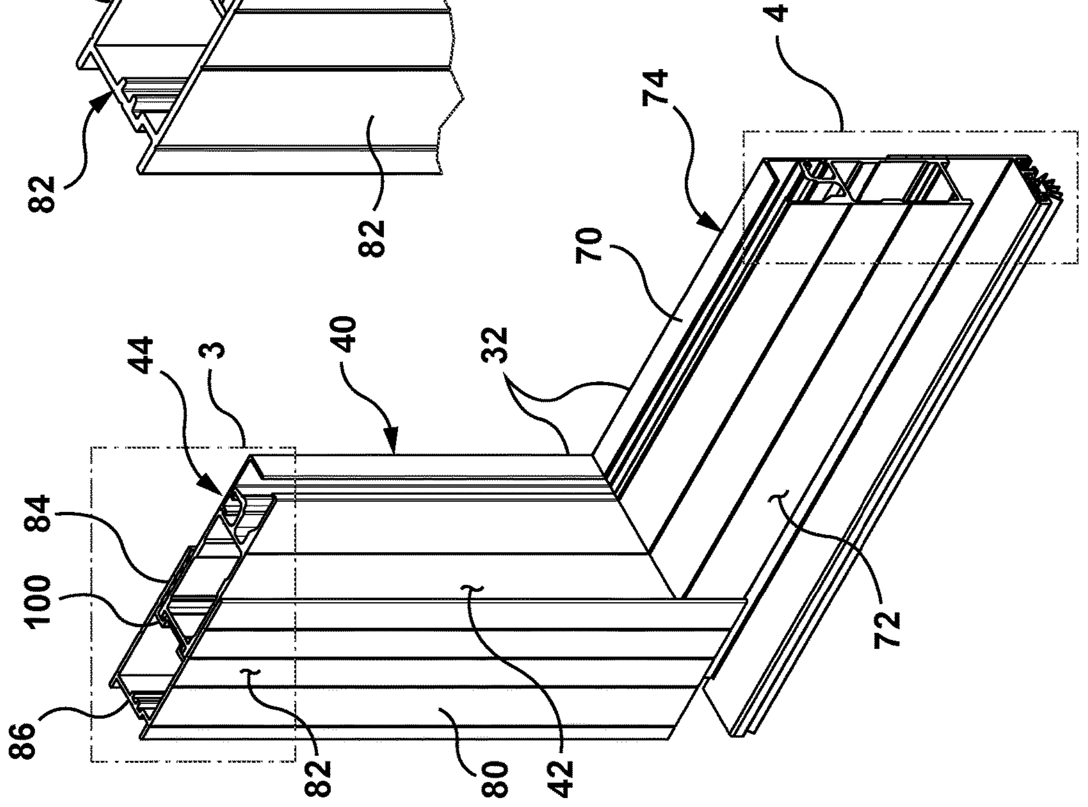
FIG. 2 is a cut-away perspective view of the area 2 in FIG. 1.

An adjustable door according to the present invention is generally indicated by reference 30 in the accompanying illustrations. The adjustable door 30. The adjustable door 30 has a generally rectangular sash 32 which extends about and supports a mesh screen 34 which would typically be a security mesh screen.

The sash 32 has a hinge side member 40 (on the hinge side of the door) opposite a closure side member 50. Opposite top and bottom members 60 and 70 respectively extend between the hinge side member 40 and closure side member 50.

Each of the hinge side member 40 and bottom member 70 have a respective inner face 42, 72 respectively and a respective outer face 44, 74 respectively.

The hinge side member 40 has an edge face 46 extending between its inner face 42 and outer face 44.

The bottom member 70 has a downwardly facing lower face 76 extending between its inner face 72 and outer face 74.

A U-sweep member 80 runs along the hinge side member 40 adjacent the edge face 46 of the hinge side member 40. The U-sweep has a generally rectangular U-shaped cross-section having a base 86 and opposite side legs 82 and 84 respectively. The base 86 and legs 82 and 84 define a channel for receiving a part of the hinge side member 40 with the legs 82 and 84 being respectively facing (adjacent) the inner face 42 and outer face 44 of the hinge side member 40.

The edge face 46 of the hinge side member faces the base 86 of the U-sweep member 80.

A step adjust adaptor 100 is secured to said hinge side member 40 and extends along at least one of said outer face 44 and inner face 42 of the hinge side member 40 between the hinge side member 40 and the U-sweep 80.

The step adjust adaptor 100 and the U-sweep member 80 have respective parts of a step lock mechanism 120 which is described in more detail below.

The step lock mechanism provides a plurality of detents for arresting the U-sweep member 80 with its base 86 at pre-determined spacings from the edge face 46 of the hinge side member 40 to enable varying the breadth of the adjustable door 30.

The adjustable door 30 has an L-sweeper 140. The L-sweeper 140 has an attachment arm 142 which is securable to the outer face 72 of the bottom member 70. The L-sweep also has a sweeper arm 144 generally perpendicular to the attachment arm 142. When mounted to the bottom member 80, the sweeper arm 144 extends below and across the lower face 76 of the bottom member 70.

The sweeper arm 144 has a downwardly opening channel 146 running therealong for receiving a sweeping member 150. The sweeping member 150 may be a rubber serrate as illustrated, bristles or other suitable material for filling the gap between the sweeper member and an underlying surface while allowing opening and closing of the adjustable door 40.

Figure 16:
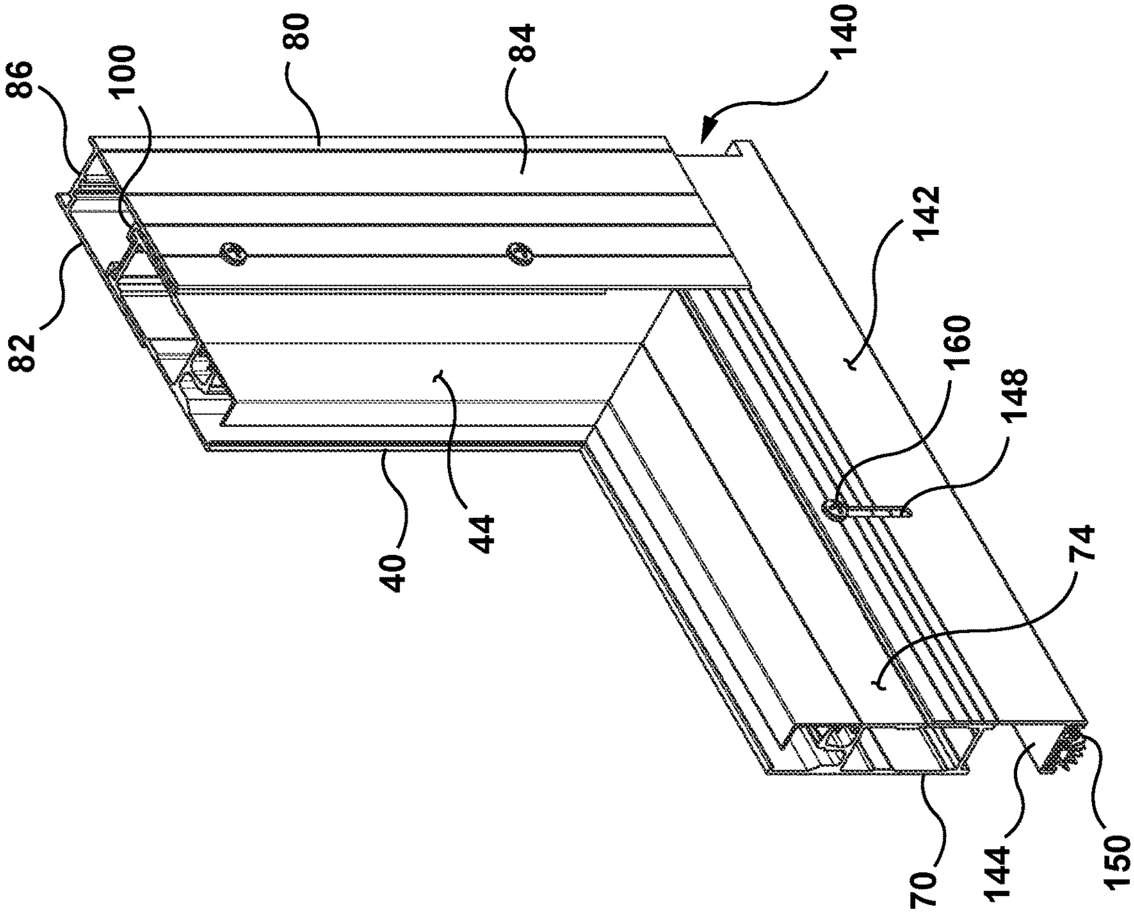
FIG. 16 is a perspective view corresponding to FIG. 1 but taken from the opposite side.
Figure 15:
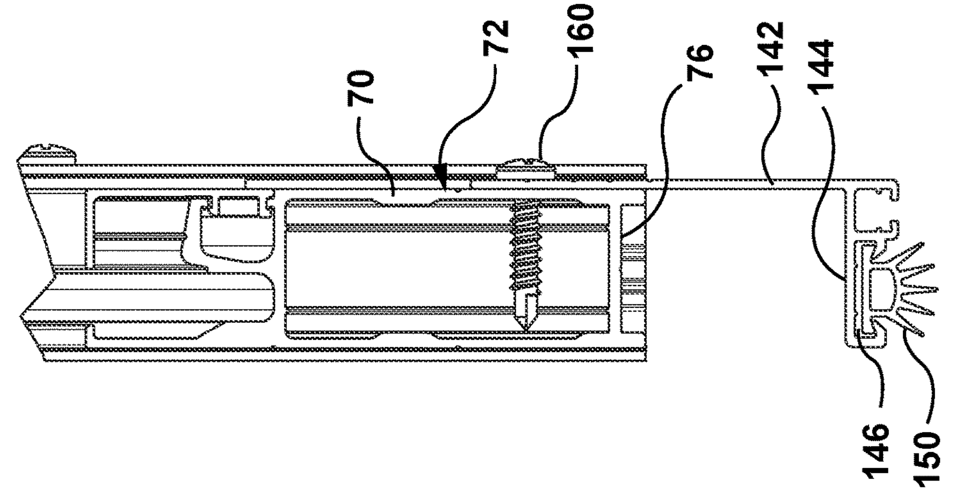
FIG. 15 is an end elevation of a lower portion of the adjustable door.

Vertically extending elongated slots 148 are provided through the attachment arm 142 (see FIG. 16). The slots 148 admit fasteners such as screws 160 for securing the L-sweeper to the bottom member 70 while providing for adjustability of the length (height) of the adjustable door 40.

The step adjust adaptor 100 may have a variety of configuration as illustrated in FIGS. 17 through 23. Each configuration includes a strip 102 which extends along the hinge side member 40 along its outer face 144 adjacent the edge face 46. The FIGS. 19 and 22 embodiment is simply the strip 102 which would be secured to the outer face 44 of the hinge side member 40, typically with screws but alternate fasteners or adhesives may be used.

Figure 17:
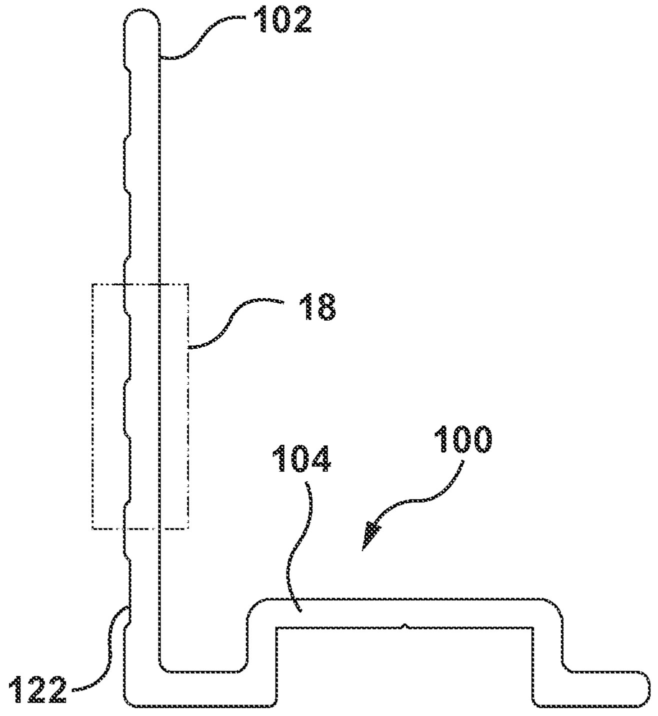
FIG. 17 is a top plan view of a first embodiment of a step adjust adaptor according to the present invention.
Figure 18:
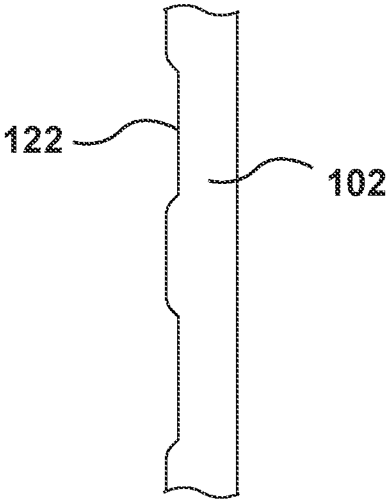
FIG. 18 is an enlargement of the area 18 in FIG. 17.
Figure 19:
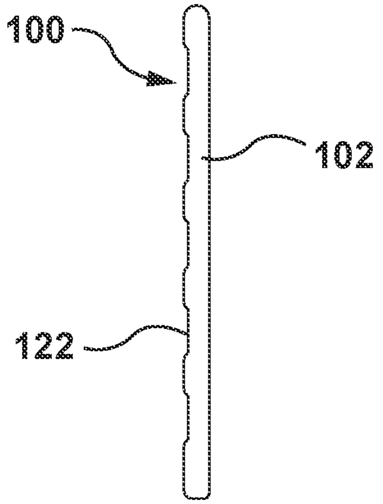
FIG. 19 is top plan views of a second embodiment of a step adjust adaptor according to the present invention.
Figure 23:
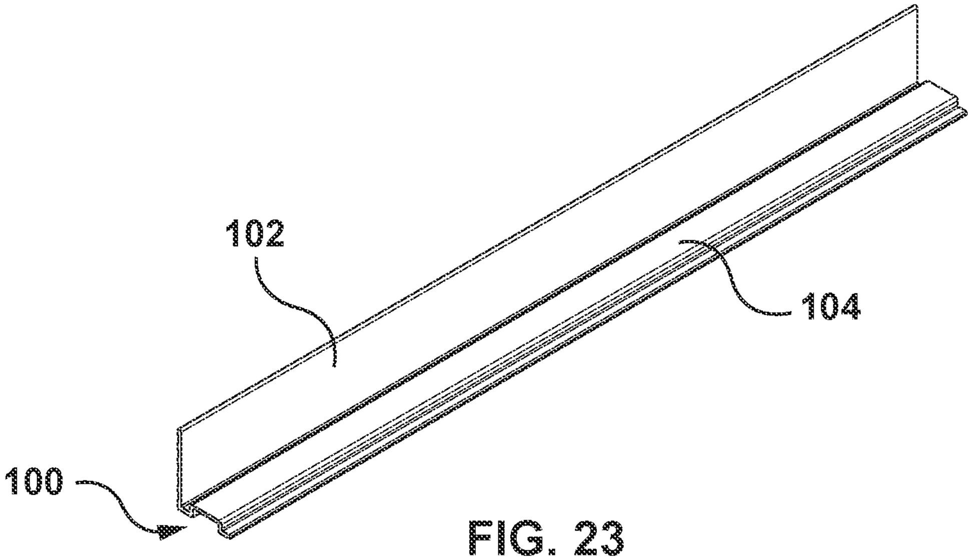
FIG. 23 is a perspective view corresponding to FIG. 17.
Figure 24:
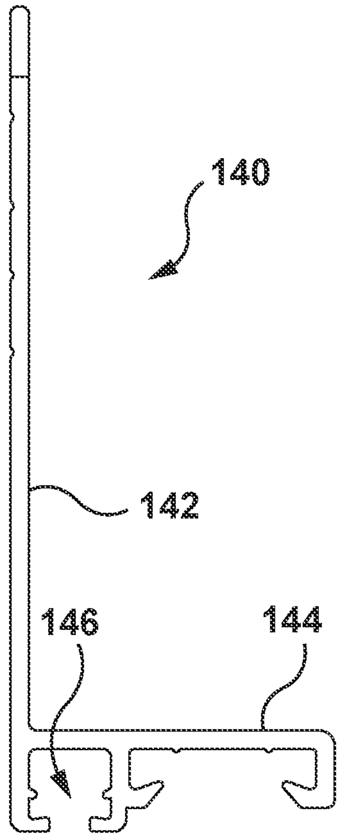
FIG. 24 is an end elevation of an L-sweeper according to the present invention.
Figure 25:
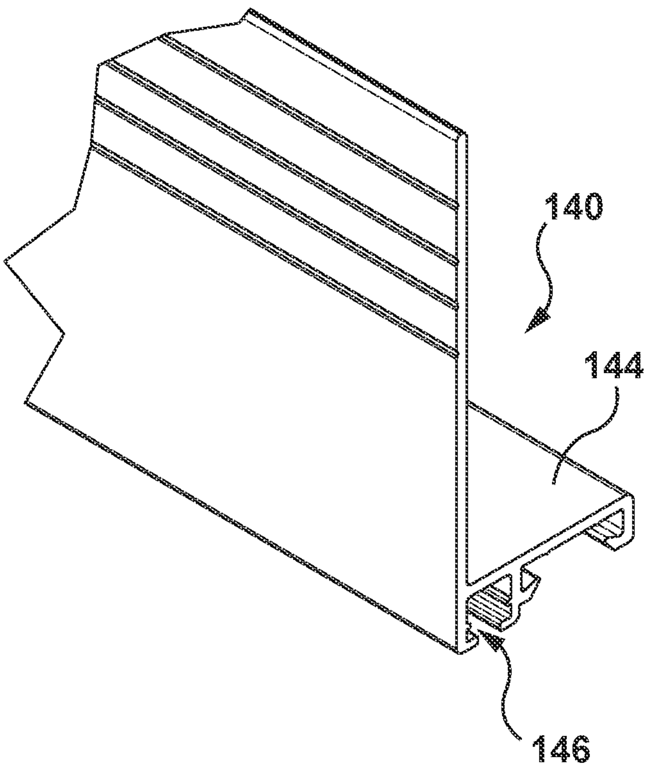
FIG. 25 is a perspective view of an end of the L-sweeper.
Figure 26:
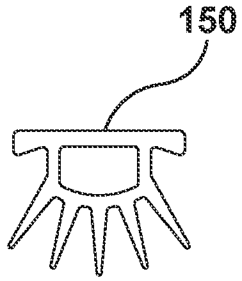
FIG. 26 is an end elevation of a sweeper according to the present invention.
Figure 27:
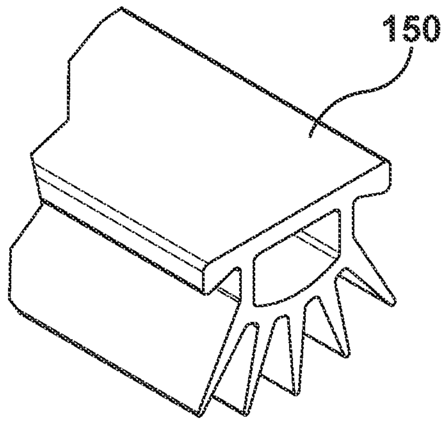
FIG. 27 is a perspective view of an end of the sweeper of FIG. 26.

The FIGS. 17 and 23 embodiment has a generally L-shaped configuration in which a base 104 extends from an edge of the strip 102 across the edge face 46 of the hinge side member 40 and is secured thereto with a fastener 162.

Figure 20:
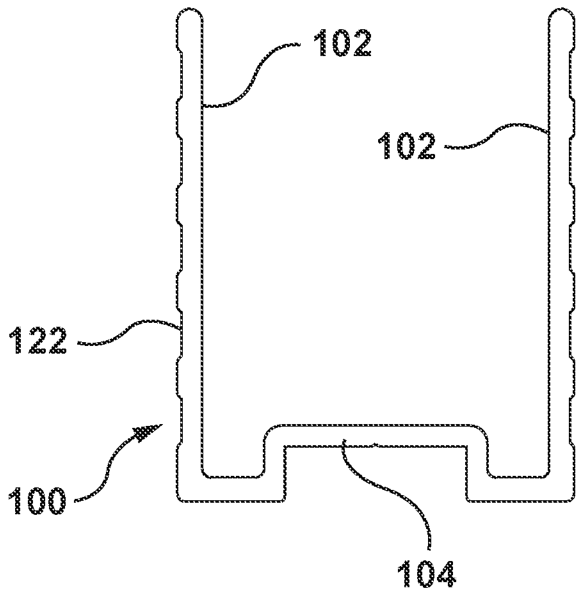
FIG. 20 is a top plan view of a third embodiment of a step adjust adaptor according to the present invention.
Figure 21:
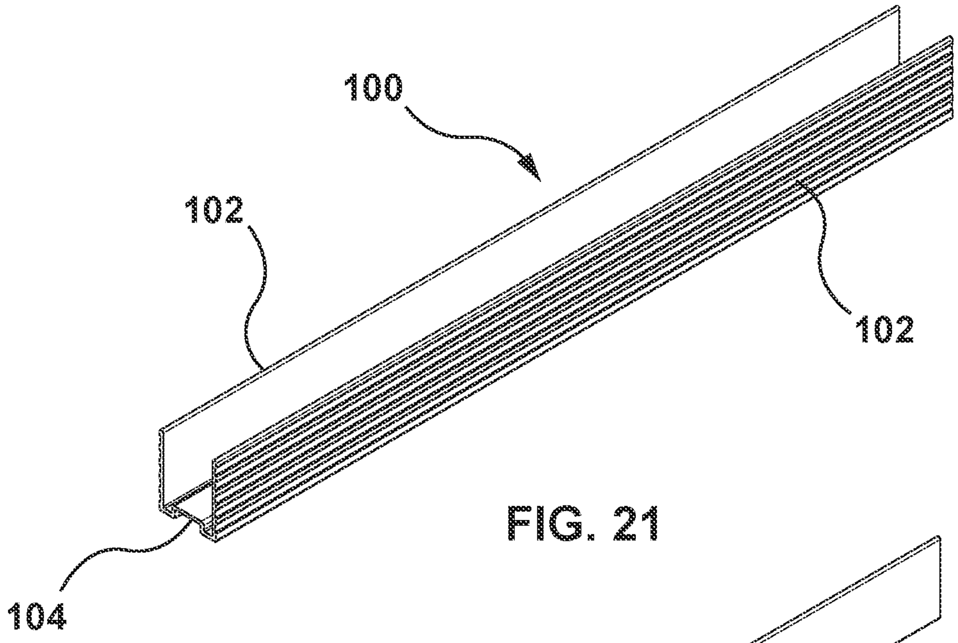
FIG. 21 is a perspective view corresponding to FIG. 20.
Figure 22:
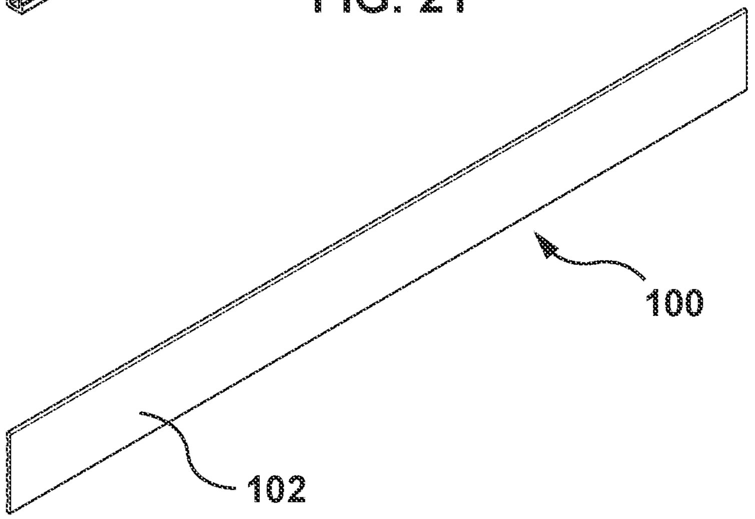
FIG. 22 is a perspective view corresponding to FIG. 19.

The FIGS. 20 and 21 embodiment has two strips 102 joined at one end to a base 104 in a generally U-shaped configuration. The base 104 would be secured to the edge face 46 hinge side member 40 with one of the strips 102 running along the inner face 42 of the hinge side member 40 and the other strip 102 running along the outer face 44 of the hinge side member 40.

The step lock mechanism 120 comprises a plurality of generally parallel receiver channels 122 running along either the step lock adjustor or an interior face 88 of the U-sweep. The former is illustrated but the latter is an alternative. The step lock mechanism further comprises at least one ridge 124 running along the other of the step lock adjuster 100 and the interior face 88 of the U-sweep for engaging the channels 122. This provides for a detent mechanism that holds the U-sweep 80 in alignment with the hinge side member 40 in various degrees of extension. Once the appropriate degree of the extension (i.e. breadth of the doors( ) is selected, fasteners such as self-drilling screws 164 which extend through the U-sweep, step adjust adaptor 100 and hinge side member 40 may be used to secure the assembly in position.

Figure 5:
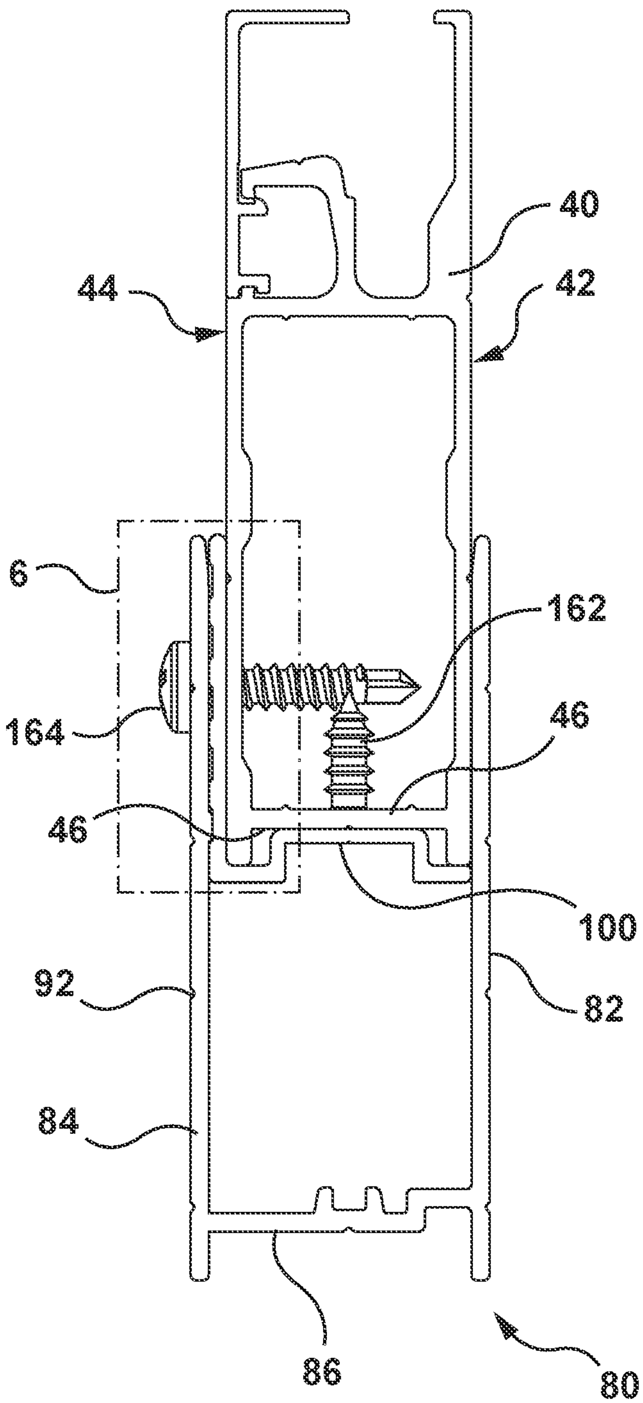
FIG. 5 is a top plan view of a hinge side member, U-sweep and step adjust adaptor according to the present invention showing the U-sweep adaptor in an extended configuration.
Figure 6:
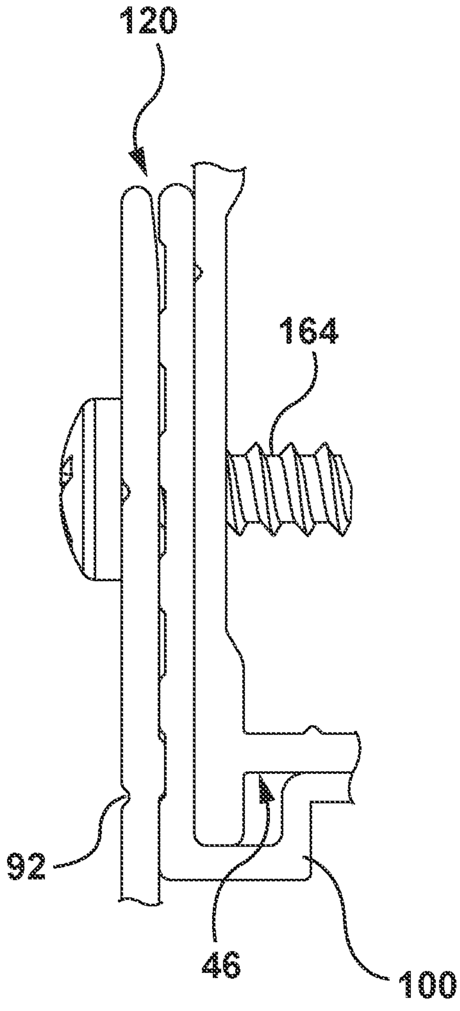
FIG. 6 is an enlargement of the area 6 in FIG. 5.
Figure 7:
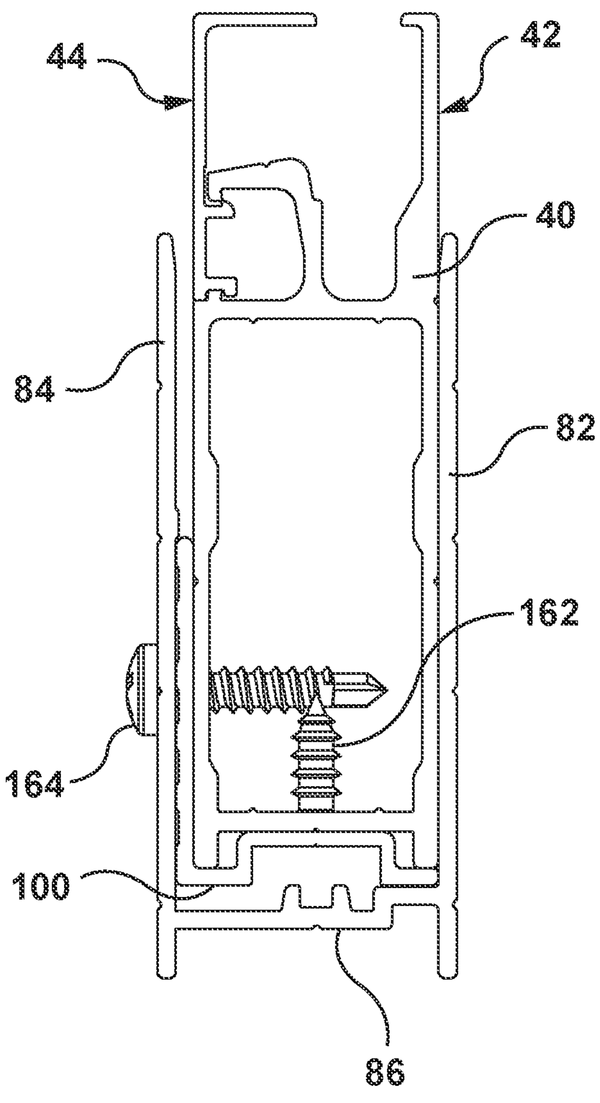
FIG. 7 is a top plan view of the hinge side member, U-sweep and step adjust adaptor showing the U-sweep adaptor in a retracted configuration.
Figure 8:
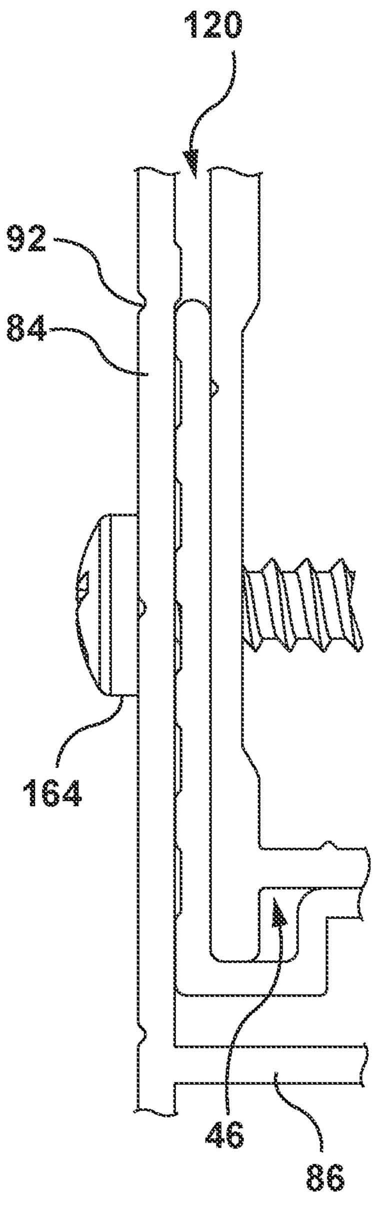
FIG. 8 is an enlargement of the area 8 in FIG. 7.

FIGS. 5 and 6 show the U-sweep member in an extended configuration relative to the hinge side member 40. FIGS. 7 and 8 show a retracted configuration.

To aid in screw positioning/alignment, an outer face 90 of at least one of the legs 82, 84 of the U-sweep member 80 may be provided with a plurality of generally parallel V-grooves 92 running along a length thereof.

The U-sweep adaptor 80 may have a ridge 124 extending inwardly from either the leg 84 or both legs 84 and 82 depending on whether the step adjust adaptor 100 has one or two strips 102.

Figure 9:
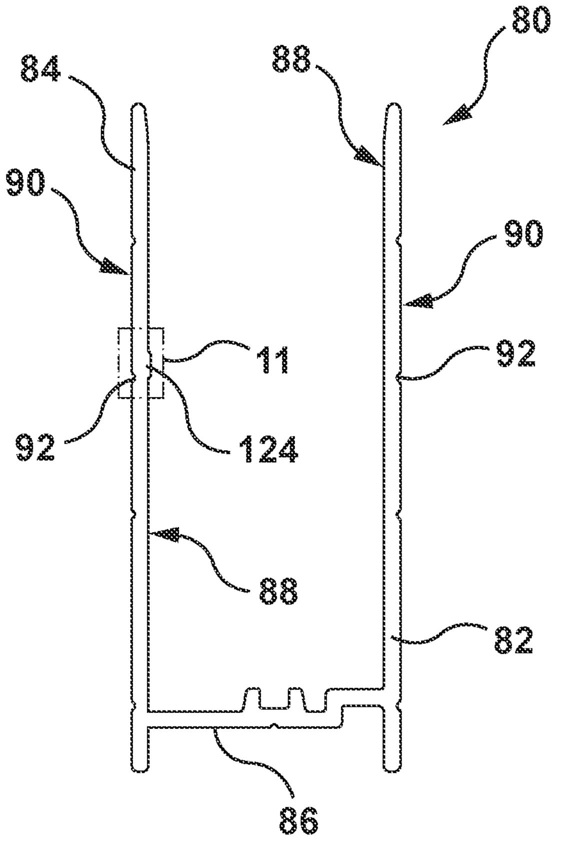
FIG. 9 is a top plan view of a first embodiment of a U-sweep member according to the present invention.
Figure 14:
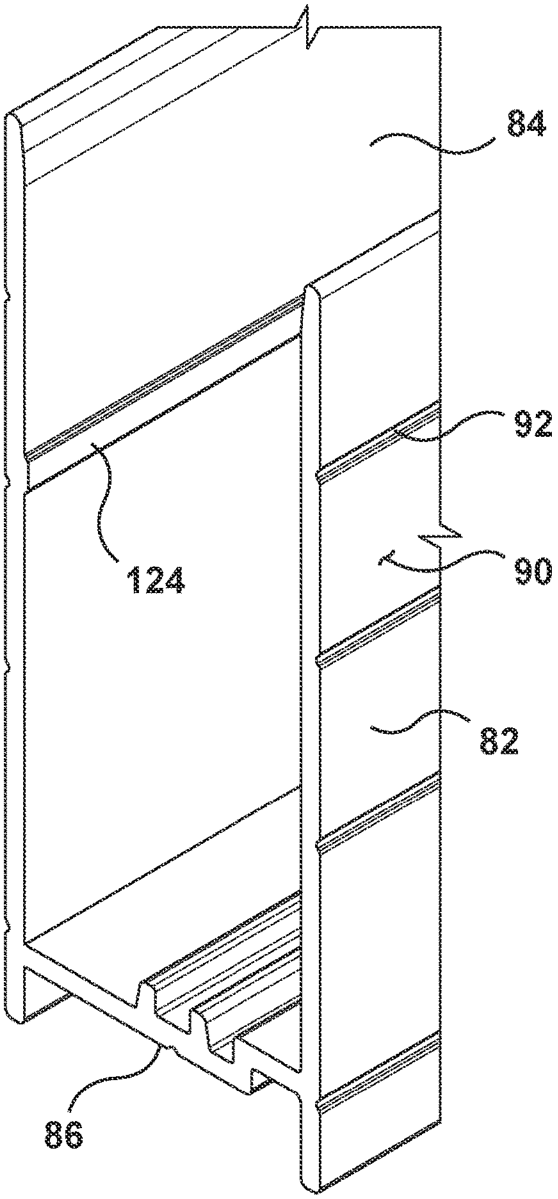
FIG. 14 is a perspective view of an end of the U-sweep of FIG. 9.

FIGS. 9 and 14 show a U-sweep member 80 having a single ridge 124 extending inwardly from the interior face 88 of the U-sweep adaptor 80. This configuration would be used for the step adjust adaptor embodiments illustrated in FIGS. 17, 19, 22 and 23.

Figure 10:
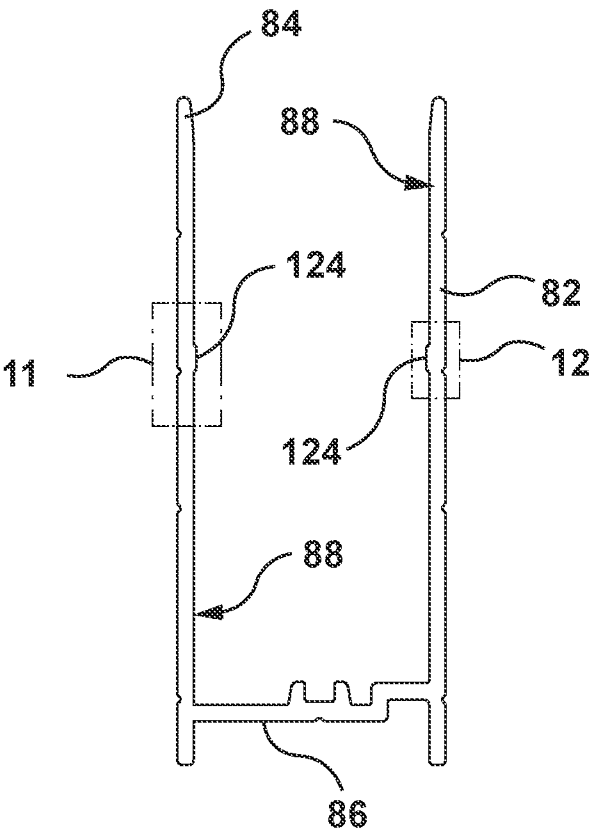
FIG. 10 is a top plan view of a second embodiment of a U-sweep member according to the present invention.
Figure 11:
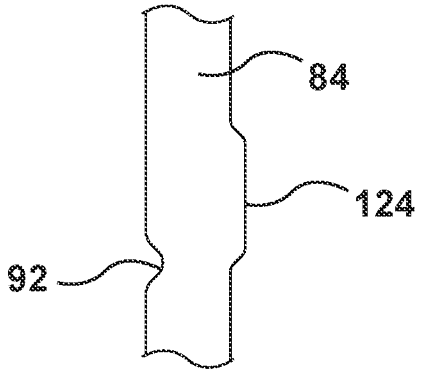
FIG. 11 is an enlargement of the area 11 in FIG. 9.
Figure 12:
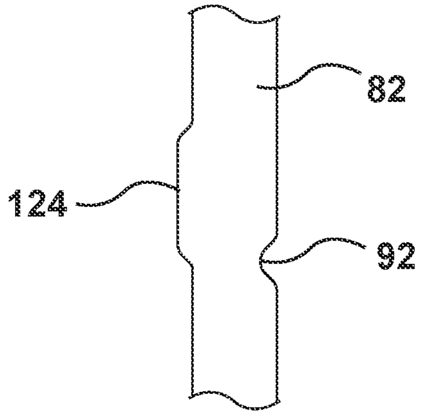
FIG. 12 is an enlargement of the area 12 in FIG. 10.
Figure 13:
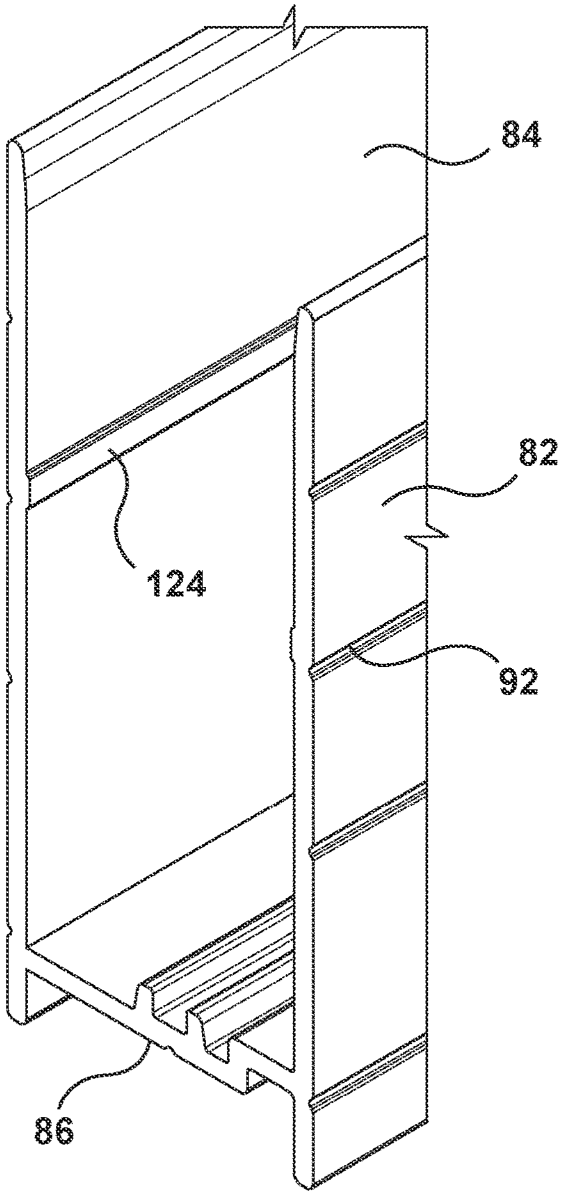
FIG. 13 is a perspective view of an end of the U-sweep of FIG. 10.

In the case of the embodiment of the step adjust adaptor 100 illustrated in FIGS. 20 and 21, the U-sweep member 80 would have an additional ridge 124 extending inwardly from the leg 82 as illustrated in FIGS. 10 and 13.

Further aspects of the invention are provided by the subject matter of the following clauses:

An adjustable door comprising: an outer sash having a hinge side member opposite a closure side member with opposite top and bottom members extending between and attached to said hinge side and closure side members to define a generally rectangular sash extending about a door panel; each of said hinge side and bottom members having an inner face opposite an outer face; said hinge side member having an edge face extending between its inner and outer face; said bottom member having a downwardly facing lower face extending between its inner and outer faces; a U-sweep member having a generally rectangular U-shaped cross-section having a base and opposite side legs defining a channel for receiving part of said hinge side member between said opposite legs with a respective of said opposite side legs facing said front and said rear faces of said hinge side member; a step adjust adaptor secured to said hinge side member and extending along at least one of said outer and inner faces of said hinge side member between said hinge side member and said opposite legs of said U-sweep; said step adjust adaptor and said U-sweep member having respective parts of a step lock mechanism running along a length thereof, said step lock mechanism providing a plurality of spaced apart detent positions for arresting said U-sweep member with its base as pre-determined spacings from said edge face of said hinge side member to vary a breadth of said door.

The adjustable door of any preceding clause further comprising an L-sweeper securable to the bottom member, said L-sweeper having an attachment arm generally perpendicular to a sweeper arm; said attachment arm being securable to said outer face of said bottom member with said sweep arm extending below said lower face of said bottom member; said sweep arm having a channel for receiving a sweeping member.

The adjustable door of any preceding clause wherein said step adjust adaptor has a generally L-shaped cross-section with a base of said L extending across said edge face of said hinge side member and being secured thereto.

The adjustable door of any preceding clause having two said step adjust adaptors joined by a base to define a generally U-shaped cross-section said base being secured to said edge face of said hinge side member, one of said two step adjust adaptors running along said inner face of said hinge side member and the other of said two step adjust adaptors running along said outer face of said hinge side member.

The adjustable door of any preceding clause wherein said step lock mechanism comprises a plurality of generally parallel receiver channels running along one of said step lock adjuster and an interior face of at least one of said legs of said U-sweep and at least one ridge running along the other of said step lock adjuster and an interior face of said U-sweep for engaging said channels.

The adjustable door of any preceding clause wherein said sweeping member is rubber serrate or bristles.

The adjustable door of any preceding clause wherein said sash, U-sweep and step adjust adaptor are aluminium extrusions.

The adjustable door of any preceding clause wherein said sash, U-sweep, step adjust adaptor and L-sweep are aluminium extrusions.

The adjustable door of any preceding clause wherein an outer face of at least one of said legs of said U-sweep member has a plurality of generally parallel V-grooves running therealong to provide an alignment indicator for the mounting fixing screws for extending through said leg, said step adjust adaptor and said rear face of said hinge side member.

The adjustable door of any preceding clause wherein the sweeper arm 144 of the L-sweeper has vertically extending slots to admit fasteners for adjustably securing the L-sweep 140 to the bottom member while allowing for length adjustment of the adjustable door 30.

The above detailed description is of preferred embodiments. The description is intended in an illustrative rather than a restrictive sense. Variations may be apparent to those skilled in the art without departing from the scope of the invention as defined by the claims set out below.

PARTS LIST

30 Adjustable door
32 Sash

34 Mesh Screen
40 Hinge side member (HSM)
42 Inner face HSM
44 Outer face HSM
46 Edge face HSM
50 Closure side member
60 Top member
70 Bottom member (BM)
72 Inner face BM
74 Outer face BM
76 Lower face BM
80 U-sweep member (USM)
82 Leg—USM
84 Leg—USM
86 Base—USM
88 Interior face—USM
90 Outer face—USM
92 V-grooves
100 Step adjust adaptor (SAA)
102 Strip SAA
104 Base SAA
120 Step lock mechanism (SLM)
122 Receiver channel SLM
124 Ridge SLM
140 L-sweeper (LS)
142 Attachment arm LS
144 Sweeper arm LS
146 Channel LS
148 Slots
150 Sweeping member
160 Screws
162 Fastener (base of SAA to edge of HSM)
164 Fastener (U-sweep to HSM)

What is claimed is:

1. An adjustable door comprising:

an outer sash having a hinge side member opposite a closure side member with opposite top and bottom members extending between and attached to said hinge side and closure side members to define a generally rectangular sash extending about a door panel;

each of said hinge side and bottom members having an inner face opposite an outer face;

said hinge side member having an edge face extending between its inner and outer face;

said bottom member having a downwardly facing lower face extending between its inner and outer faces;

a U-sweep member having a generally rectangular U-shaped cross-section having a base and opposite side legs defining a channel for receiving part of said hinge side member between said opposite legs with a respective of said opposite side legs facing front and rear faces of said hinge side member;

a step adjust adaptor secured to said hinge side member and extending along at least one of said outer and inner faces of said hinge side member between said hinge side member and said opposite legs of said U-sweep;

said step adjust adaptor and said U-sweep member having respective parts of a step lock mechanism running along a length thereof, said step lock mechanism providing a plurality of spaced apart detent positions for arresting said U-sweep member with its base as pre-determined spacings from said edge face of said hinge side member to vary a breadth of said door.

2. The adjustable door of claim 1 further comprising an L-sweeper securable to the bottom member, said L-sweeper having an attachment arm generally perpendicular to a sweeper arm;

said attachment arm being securable to said outer face of said bottom member with said sweeper arm extending below said lower face of said bottom member;

said sweep arm having a channel for receiving a sweeping member.

3. The adjustable door of claim 1 wherein said step adjust adaptor has a generally L-shaped cross-section with a base of said L extending across said edge face of said hinge side member and being secured thereto.

4. The adjustable door of claim 1 having two said step adjust adaptors joined by a base to define a generally U-shaped cross-section said base being secured to said edge face of said hinge side member, one of said two step adjust adaptors running along said inner face of said hinge side member and the other of said two step adjust adaptors running along said outer face of said hinge side member.

5. The adjustable door of claim 1 wherein said step lock mechanism comprises a plurality of generally parallel receiver channels running along one of said step lock adjuster and an interior face of at least one of said legs of said U-sweep and at least one ridge running along the other of said step lock adjuster and an interior face of said U-sweep for engaging said channels.

6. The adjustable door of claim 1 wherein said U-sweep member is rubber serrate or bristles.

7. The adjustable door as claimed in claim 1 wherein said outer sash, said U-sweep and said step adjust adaptor are aluminium extrusions.

8. The adjustable door of claim 2 wherein said outer sash, said U-sweep, said step adjust adaptor and said L-sweeper are aluminium extrusions.

9. The adjustable door of claim 1 wherein an outer face of at least one of said legs of said U-sweep member has a plurality of generally parallel V-grooves running therealong to provide an alignment indicator for mounting fixing screws for extending through said leg, said step adjust adaptor and said rear face of said hinge side member.

10. The adjustable door of claim 2 wherein the sweeper arm of the L-sweeper has vertically extending slots to admit fasteners for adjustably securing the L-sweeper to the bottom member while allowing for length adjustment of the adjustable door.

* * * * *